Nov. 29, 1949  J. D. O'BRIEN  2,489,496
BRAKE SHOE LINING BONDING DEVICE
Filed Nov. 1, 1947  2 Sheets-Sheet 1
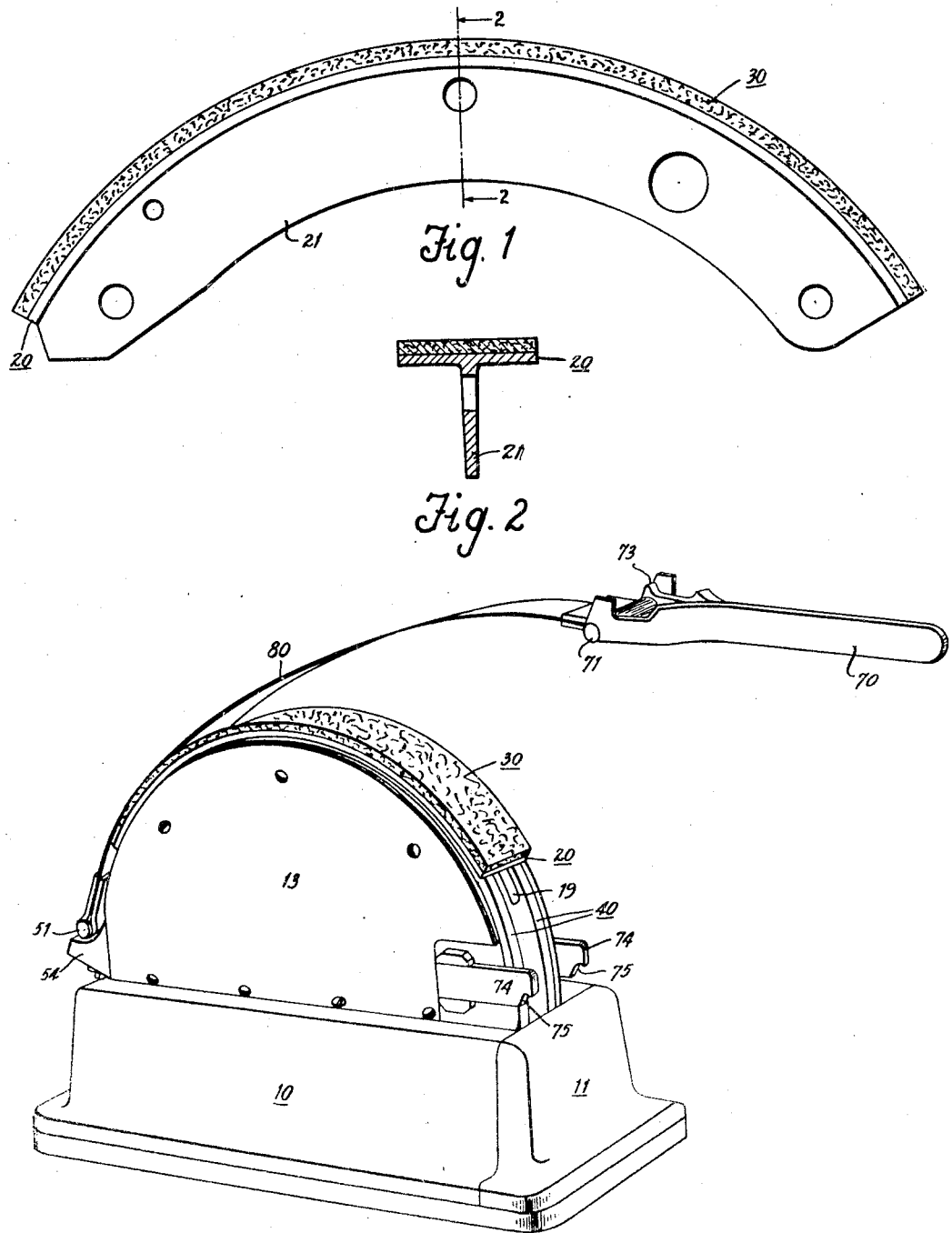
INVENTOR
John D. O'Brien
BY Spencer Hardman & Fehr
his attys.

Nov. 29, 1949 J. D. O'BRIEN 2,489,496
BRAKE SHOE LINING BONDING DEVICE
Filed Nov. 1, 1947 2 Sheets-Sheet 2
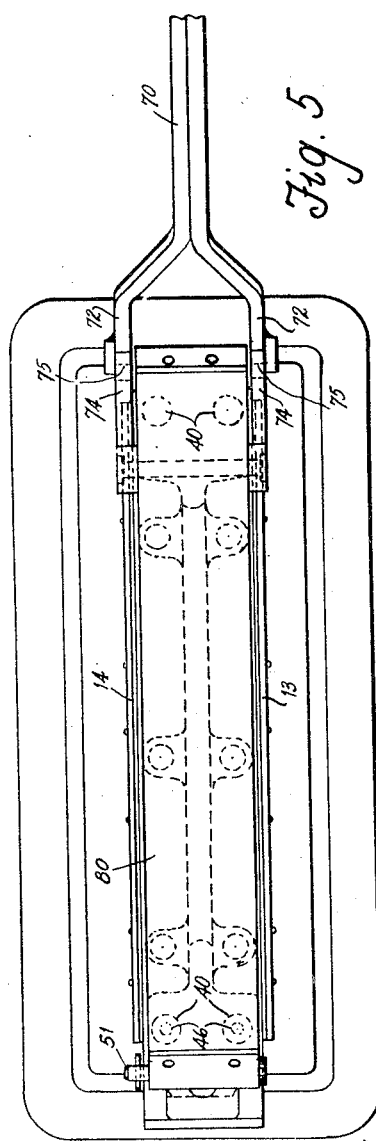
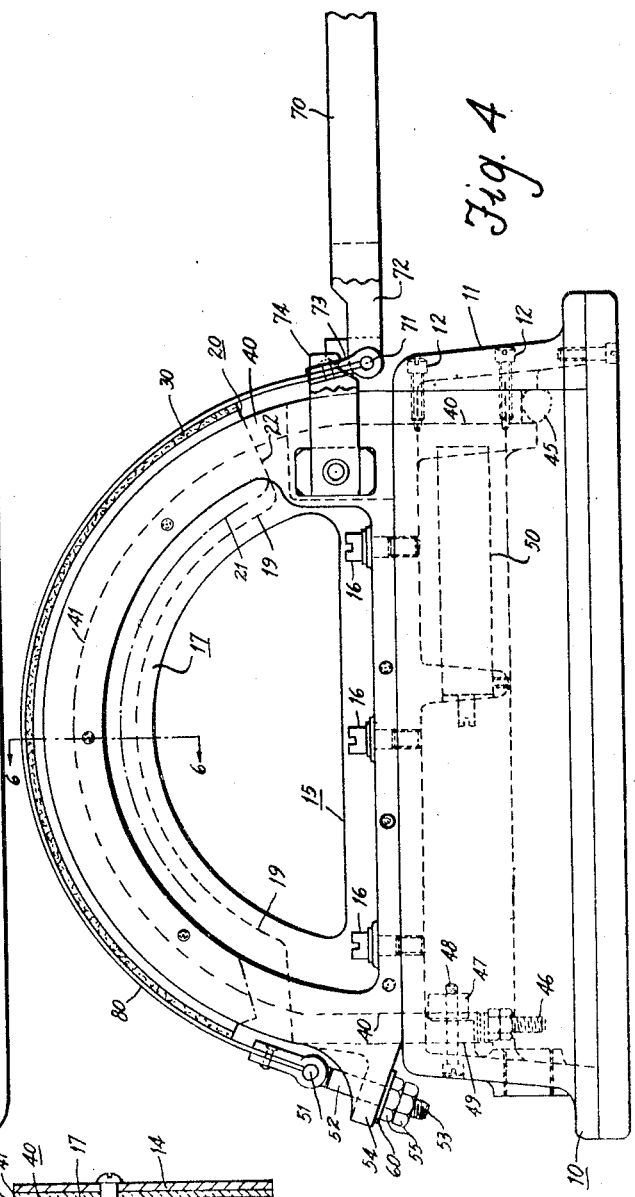
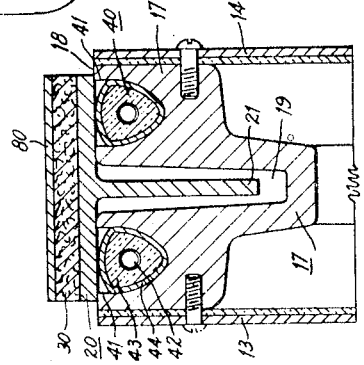
INVENTOR
John D. O'Brien
By Spencer Hardman & Fehr
his Attys.

UNITED STATES PATENT OFFICE 2,489,496

BRAKE SHOE LINING BONDING DEVICE

John D. O'Brien, Dayton, Ohio, assignor to General Motors Corporation, Detroit, Mich., a corporation of Delaware Application November 1, 1947, Serial No. 783,464

6 Claims. (Cl. 154—1)

This invention relates to a heating fixture for directly bonding friction linings to metal brake shoes, and the like.

Molded friction linings commonly are made from compounds containing asbestos fiber, heat-resisting friction powders, phenol-formaldehyde or other thermo-setting resins, rubber, sulphur, various inert fillers, or various combinations of these ingredients. Such friction linings may be bonded in various ways directly to the convex surface of metal brake shoes so that they strongly adhere thereto. A well-known method of such bonding uses an interposed relatively thin coating or layer of thermosetting resin or other bonding material between the molded lining and the metal surface to which it is to be bonded. A suitable bonding coating is an alcohol solution of uncured phenol-formaldehyde resin (in A stage), which may be applied to the inner surface of the friction lining, or to the metal surface to which the lining is to be bonded, or to both. Another method is to interpose a relatively thin bonding layer, which contains a suitable thermo-setting resin, between the friction lining and the metal surface of the brake shoe. Now when such a friction lining is tightly clamped upon the surface to which it is to be bonded and subjected to a curing temperature for a sufficient period to cure the thermosetting bonding material interposed therebetween a strong bond results.

The general object of this invention is to provide an improved and convenient portable means for effectively and efficiently carrying out the step of bonding the friction lining to the convex surface of the brake shoe under heat and pressure.

Another object is to provide an electrically heated clamping fixture wherein the electric heating element is located in good thermal conductivity relation with the surface of the brake shoe flange opposite to that to which the lining is being bonded, whereby the temperature of the flange itself can be very precisely controlled by regulating the current to the heating element. It has been found that if the heating element is located a substantial distance from the brake shoe flange the temperature of the flange will not follow immediately and precisely the temperature of the heating element due to unavoidable heat loss by radiation, conduction, etc., in which case a thermostatic control of the current to the heating element will not give a very precise control of the temperature of the shoe flange. Also in such cases the time element enters the picture importantly, since it will require an appreciable time for changes in temperature of the heating element to have a corresponding effect upon the temperature of the flange.

Another object of the invention is to provide an electrically heated clamping fixture wherein the heating element is permanently mounted and fixed in grooves on the clamping surface of the fixture so as to provide an immediate heat transfer to the under side of the brake shoe flange when the brake shoe is clamped in place in said fixture.

Another object is to provide a thermostatic control of the temperature of the electric heating element and thereby provide a very precise thermostatic control of the temperature of the brake shoe flange uniformly from end to end thereof, due to the good thermal conductivity relation between the heating element and the brake shoe flange over the entire bonding area of said flange.

Further objects and advantages of the present invention will be apparent from the following description, reference being had to the accompanying drawings wherein a preferred embodiment of the present invention is clearly shown.

In the drawings:

Fig. 1 is a side view of an automobile brake shoe having a molded friction lining bonded to the convex surface of its flange, and represents a typical final product of the bonding fixture of this invention.

Fig. 2 is a section on line 2—2 of Fig. 1.

Fig. 3 is a perspective view of the bonding fixture of this invention, and shows the brake shoe and lining inserted in proper position thereupon and ready to be tightly clamped down upon the convex clamping surface of said fixture by the flexible steel band overlying same.

Fig. 4 is a side elevation of the bonding fixture with the shoe and lining tightly clamped in place therein. This figure shows one side cover plate 13 removed to more clearly show the interior construction, and also shows certain portions in dotted lines.

Fig. 5 is a plan view of Fig. 4 but with both side cover plates 13 and 14 in place, as finally assembled.

Fig. 6 is a section on line 6—6 of Fig. 4, except that it shows both side cover plates in place.

In the drawings similar reference characters refer to similar parts throughout the several views.

Numeral 10 designates the cast metal supporting base, which has a removable front 11 rigidly fixed thereto by screws 12. Fixed upon the flat upper surface of base 10 is the metal casting 15 which has the general form of the letter D with the flat side thereof rigidly fixed to base 10 by screws 16. The outer curved portion 17 of casting 15 forms a rigid solid support upon which the brake shoe flange 20 is clamped during the bonding of the friction lining 30 thereto. The cylindrical surface 18 of this portion 17 conforms closely with the inner concave surface of brake shoe flange 20 when the latter is set thereupon, while the central rib 21 of said shoe is loosely received within the slot 19 provided therefor, as more clearly shown in Fig. 6.

The electric heating element 40 is snugly fitted and permanently set within grooves 41 in the support 17 in such manner that said heating element 40 will directly and uniformly heat the flange 20 of the brake shoe throughout its length and width. For this purpose, heating element 40 has one reach thereof embedded in a groove 41 on one side of recess 19 and another reach thereof embedded in a groove 41 on the oposite side of recess 19, as clearly shown in Fig. 6. Heating element 40 comprises an electric resistance wire coil 42 embedded within a suitable insulating material 43, such as magnesium oxide or insulating clay, and encased within an outer sheath 44 of corrosion-resisting iron or other suitable metal. Preferably the cross sectional shape of element 40 is somewhat flattened at its outer surface, as shown in Fig. 6, and other portions thereof fit snugly within the grooves 41 so as to solidly retain element 40 permanently in fixed position. The flattened outer surface of metal sheath 44 is arranged to lie substantially flush with the arcuate surface 18 against which the flange 20 of the brake shoe is firmly clamped when the parts are in the position shown in Fig. 4. When thus assembled heat is transferred by conduction directly from heating element 40 to the under surface of flange 20, and thus flange 20 is uniformly heated throughout its length and width. Also the temperature of flange 20 at all times during the bonding operation may be accurately and uniformly controlled by controlling the temperature of the electric element 40 itself by means of a suitable thermostatic switch actuated by the temperature of any portion of heating element 40.

In the fixture shown in the drawings the thermostatic switch unit 50 is conveniently located and suitably mounted within the hollow space inside base 10. Thermostatic unit 50 is precisely actuated by the temperature of the looped end 45 of heating element 40 which surrounds and is in close heat-conducting relation with the thermostat element of said unit 50. Any well-known and suitable form of thermostatic switch unit may be used with the fixture of this invention, hence said switch unit is diagrammatically illustrated in the drawings as of the cartridge type. However it is important that this thermostatic switch be directly and immediately responsive to the temperature of heating element 40 itself. Since heating element 40 is uniformly heated thruout its length by the electric current passing therethru, the thermostatic unit 50 may be located in close association with the looped end 45 of element 40 even though said looped end 45 be located some distance from the brake shoe flange 20. In other words, the thermostatic unit need not be located in close heat-conducting relation with the brake shoe itself in order to precisely regulate the temperature of flange 20, but may be located at a more convenient location and still provide the desired precise regulation of the temperature of flange 20.

The two open ends of heating element 40 extend downwardly in parallel relation thru holes in castings 15 and 10 and are provided each with a terminal post 46 to which the electric wires (not shown) which supply the heating current are fastened. Heating element 40 is rigidly clamped in position near its two terminals by a clamping member 47 and its through bolt 48, which clamp the two terminal portions of said element 40 against seats 49 provided therefor in casting 10 (see Fig. 4). Thus heating element 40 extends in a continuous length from one terminal post 46, thru one groove 41 around to the forward loop 45, thence around thermostatic unit 50 by means of loop 45, thence thru the opposite groove 41 back around to the second terminal post 46. The two reaches of heating element 40 lie parallel on opposite sides of web 21 of the brake shoe, as clearly shown in Fig. 6.

In operation, the metal brake shoe 20 is inserted in the fixture simply by loosely inserting its web 21 in recess 19 provided therefor so that its forward end 22 abuts against the end of recess 19 as shown in Fig. 4. The slightly flexible brake lining 30 is then placed loosely in position around flange 20 with the desired bonding coating or bonding layer (as the case may be) interposed between said lining 30 and flange 20. Then lining 30 and flange 20 are tightly clamped down upon the rigid arcuate surface 18 of the fixture by means of a flexible spring steel band 80. The rear end of steel band 80 is hinged to pin 51 which is supported by a fitting 52 whose shank 53 extends thru a hole in projection 54 on casting 15. A cupped and slotted spring steel disc 60 and nuts 55 threaded upon shank 53 retain fitting 52 in place. This spring steel cup 60 bears against the under side of stationary projection 54 and is flattened out by the tension put upon flexible band 80, and thus provides a follow-up for the tension applied to the flexible band 80. The opposite end of band 80 is hinged to pin 71 extending between the two prongs 72 of handle 70. Each prong 72 has a projecting lug 73 thereon which can be hooked under the two cooperating projections 74 rigidly fixed to opposed sides of casting 15. With the parts in position shown in Fig. 3, handle 70 is moved down by hand and its two lugs 73 hooked under projections 74 while handle 70 is held substantially vertically. Handle 70 is then swung to its horizontal position shown in Fig. 4, during which swinging pin 71 is forced downwardly with a greatly multiplied force by the leverage action of lugs 73 fulcruming in notches 75 in the cooperating projections 74. This puts the desired high tension on band 80 and flattens out the slotted spring cup 60. The tension in band 80 may be adjusted as desired by adjusting the position of nuts 55 on fitting 52.

It will now be clear that the flexible steel band 80 provides a very uniformly distributed pressure upon lining 30 over its entire area during the heating and bonding operation. Thermostatic unit 50 is arranged to cut off and on the current passing thru heating element 40 and so regulate the temperature of element 40 at its forward loop 45, as described above. Now since flange 20 of the brake shoe contacts element 40 on both reaches thereof and thruout the length of flange 20, it is clear that thermostatic unit 50 will very precisely regulate the uniform temperature of said flange 20 thruout its length and width during the bonding operation.

The portable bonding fixture of this invention is particularly applicable for bonding brake linings to brake shoes in service garages and other service stations which are not equipped with relatively expensive baking ovens suitable for this purpose. If so desired double bonding fixtures may be made according to this invention, having provisions for bonding linings to two brake shoes at the same time. Such double fixtures have a single supporting base corresponding to base 10, and duplicate structures, as described above, mounted side by side in parallel relation upon the common base. Such double fixtures may have only one thermostatic switch unit 50 arranged as described above to regulate the temperature of one of the heating elements 40, but the second heating element 40 is electrically connected by means of the terminal posts 46 so that the current to both heating elements 40 is cut off and on by single thermostat unit 50.

While the embodiment of the present invention as herein disclosed, constitutes a preferred form, it is to be understood that other forms might be adopted, all coming wihin the scope of the claims which follow.

What is claimed is as follows:

1. An electrically heated clamping fixture for use in bonding a friction lining to the outer surface of a curved metal brake shoe, comprising: a rigid body portion having an arcuate surface conforming with and adapted to rigidly support the inner curved surface of the brake shoe when said shoe is clamped thereupon, said arcuate surface having grooves therein, an electric heating element located in said grooves in direct heat-conducting relation to the inner curved surface of said brake shoe and so arranged as to uniformly heat said brake shoe throughout its length, a thermostatic control for maintaining said heating element at a substantially uniform temperature throughout its length, and a flexible metal band mounted upon said rigid body portion for clamping the friction lining upon the outer curved surface of said brake shoe and simultaneously clamping said shoe upon said arcuate surface of said fixture.

2. An electrically heated clamping fixture for use in bonding a friction lining to the convex surface of the flange of a metal brake shoe having a web portion, comprising: a convex body portion having a recess therein adapted to loosely receive said web portion and having an arcuate outer surface for rigidly backing up and supporting the shoe flange from end to end thereof when the brake shoe is clamped upon said arcuate surface, an electric heating element mounted upon said convex body portion in close thermal relation with said shoe flange and arranged to uniformly heat said flange thruout its length, and a flexible metal band mounted upon said body portion for clamping the friction lining upon the outer convex surface of said flange and simultaneously clamping said flange upon said arcuate surface in heat-conducting relation with said heating element.

3. An electrically heated clamping fixture for use in bonding a friction lining to the convex surface of the flange of a metal brake shoe having a web portion, comprising: a convex body portion having a recess therein adapted to loosely receive said web portion and having an arcuate outer surface for rigidly backing up and supporting the shoe flange from end to end thereof when the brake shoe is clamped upon said arcuate surface, an electric heating element supported by said convex body portion in close thermal relation with said shoe flange and arranged to uniformly heat said flange thruout its length, said heating element comprising an electric resistance conductor encased within an insulated metal covering, said metal covering being so arranged as to directly contact the under side of said brake shoe flange.

4. An electrically heated clamping fixture for use in bonding a friction lining to the convex surface of the flange of a metal brake shoe having a web portion, comprising: a convex body portion having a recess therein adapted to loosely receive said web portion and having an arcuate outer surface for rigidly backing up and supporting the shoe flange from end to end thereof when the brake shoe is clamped upon said arcuate surface, an electric heating element mounted on said convex body portion in close thermal relation with said shoe flange and arranged to uniformly heat said flange thruout its length, said heating element having two reaches thruout the length of said shoe flange and being embedded within corresponding grooves in said convex body portion so as to lie substantially flush with said supporting arcuate surface on the two opposite sides of said recess for receiving the web portion of the brake shoe.

5. An electrically heated fixture for use in bonding a friction lining to the convex surface of the flange of a brake shoe having a web or rib portion, said fixture comprising: a convex body portion having a circumferential recess therein adapted to receive the web or rib portion of the brake shoe and having an arcuate outer surface for supporting the shoe flange, and an electrical heating element carried by and extending circumferentially along said convex body portion so as to be positioned below the flange of the brake shoe for heating the flange.

6. An electrically heated fixture for use in bonding a friction lining to the outer arcuate surface of the flange of a brake shoe having a web portion projecting inwardly from the inner surface thereof, said fixture comprising: a convex body portion having an outer convex surface for supporting the shoe flange and a circumferential recess therein adapted to receive said web portion when the brake shoe is set upon said outer convex surface, a flexible metal band arranged to clamp the friction lining substantially uniformly thruout its length upon the outer arcuate surface of the brake shoe and simultaneously clamp said shoe flange upon said outer convex surface of said body portion, and an electrical heating element carried by and extending along said convex body portion so as to be positioned below the flange of the brake shoe for heating said flange substantially uniformly thruout its length.

JOHN D. O'BRIEN.

REFERENCES CITED

The following references are of record in the file of this patent:

UNITED STATES PATENTS

| Number | Name | Date |
|---|---|---|
| 1,450,794 | Chandler | Apr. 3, 1923 |
| 2,342,846 | Crandell | Feb. 29, 1944 |
| 2,416,427 | Bonawit et al. | Feb. 25, 1947 |
| 2,433,760 | Janes | Dec. 30, 1947 |

FOREIGN PATENTS

| Number | Country | Date |
|---|---|---|
| 347,697 | Great Britain | Apr. 23, 1931 |